United States Patent [19]

Zampini et al.

[11] Patent Number: 5,485,525
[45] Date of Patent: Jan. 16, 1996

[54] VTR CONFIGURATION OF A MODULAR AUDIO FOLLOW VIDEO MIXER

[75] Inventors: Michael A. Zampini; Alan Flum, both of Boca Raton; Donald E. Davis, Margate; Joseph J. Dombrowski, Hollywood, all of Fla.

[73] Assignees: Sony Corporation, Japan; Sony Electronics Inc., Park Ridge, N.J.

[21] Appl. No.: 119,835

[22] Filed: Sep. 13, 1993

[51] Int. Cl.[6] .................................................. H03G 9/14
[52] U.S. Cl. .................................... 381/119; 381/107
[58] Field of Search ...................... 381/119, 107

[56] References Cited

U.S. PATENT DOCUMENTS

| | | | |
|---|---|---|---|
| 4,363,001 | 12/1982 | Suzuki et al. | 381/107 |
| 5,060,273 | 10/1991 | Olah et al. | 381/119 |
| 5,175,771 | 12/1992 | Zampini et al. | 381/119 |
| 5,230,024 | 7/1993 | Zampini et al. | 381/119 |
| 5,257,317 | 10/1993 | Stavrou | 381/119 |
| 5,309,517 | 5/1994 | Barclay | 381/119 |

OTHER PUBLICATIONS

Commonly owned co-pending application, Ser. No. 08/135,351, filed on Oct. 13, 1993.
Commonly owned co-pending applicaiton, Ser. No. 08/142,974, filed on Oct. 29, 1993.

*Primary Examiner*—Stephen Brinich
*Attorney, Agent, or Firm*—Ronald P. Kananen

[57] ABSTRACT

Disclosed is a method and apparatus for configuring an audio follow video mixer used to process audio signals input from several multi-channel devices, such as VTRs. Input modules of the audio follow video mixer include a selection button for choosing the number of a VTR coupled to the mixer module and an LED display for visually indicating the VTR number to a user. The input modules also include buttons for selecting the audio channel of the selected VTR, as well as the preview bus for the selected audio channel.

15 Claims, 4 Drawing Sheets

VTR CONFIGURATION OF A MODULAR AUDIO FOLLOW VIDEO MIXER

CROSS REFERENCE TO RELATED APPLICATIONS AND PATENTS

Reference is made to the following commonly owned-co-pending applications: "UP AND DOWNLOADABLE VTR CONFIGURATION FOR AN AUDIO FOLLOW MIXER" Ser. No. 08/135,351, filed on Oct. 13, 1993; "MANUAL CROSS FADE LEARN FEATURE FOR AUDIO FOLLOW VIDEO MIXER, Ser. No. 08/142,974, filed on Oct. 28, 1993. Reference is made to commonly owned U.S. Pat. Nos. 5,175,771, entitled "VCA DECODING SCHEME FOR MULTIPLE VTR CONFIGURATION OF AN AUDIO FOR VIDEO MIXER" and No. 5,230,024 entitled "VTR CONFIGURATION DECODING SCHEME FOR AUDIO MIXER PARALLEL EDITOR INTERFACE."

FIELD OF THE INVENTION

This invention relates to the control of a configuration of multi-channel devices, such as video tape recorders (VTRs), associated with an audio follow mixer. More specifically, this invention relates to an improved method and apparatus for associating various configurations of multichannel devices with the input modules of an audio follow mixer.

BACKGROUND OF THE INVENTION

In order to accomplish audio editing, it is known to use an audio follow mixer to control a plurality of multi-channel devices, such as VTRs. It is also known that an editor may be advantageously used to control the mixer via an editor interface to enable various VTR functions, such as PREVIEW/REVIEW and FADE UP/DOWN.

Generally, in a mixer system, a mixer is connected to a plurality of devices such at VTRs or other multi-channel devices. The mixer may also be connected to an editor via an editor interface to permit editor control of the mixer. In this way, the editor may be used to control the processing of the various signals introduced into the mixer.

However, prior systems are limited in that many mixers are designed to edit signals from devices exclusively using the same number of channels. For example, an editor may be limited in controlling input to a mixer from devices all of which have only two channels. In order to circumvent this limitation, it is possible to use hard wire jumpers. However, this solution has the drawback of being time-consuming and complicated, especially where several devices are used. Each time a different device is introduced, for example, a two-channel device replacing a four-channel device, rewiring becomes necessary.

A scheme incorporating an improved method of configuring such mixer systems is described in U.S. Pat. No. 5,175,771, which utilizes a configuration selector to choose a desired configuration of multi-channel devices. This permits configuration selection in conjunction with a video editor.

While allowing the use of various combinations of multi-channel devices, the improved scheme of U.S. Pat. No. 5,175,771 is limited in versatility in that each multi-channel device must be assigned to a particular series of mixer channels. For example, a four channel VTR might be assigned to mixer channels 1, 2, 3 and 4 when, at times, it may be desired that the VTR be coupled to mixer channels 1, 2, 5 and 6, reserving channels 3 and 4 for other uses.

This limitation of prior mixer systems is more pronounced when a modular type of mixer is used. In such a mixer, various types of modules can be easily substituted to increase the possible uses of the mixer system. For example, ten bays of a mixer may be used to accept all monaural modules, or selected monaural modules may be replaced with stereo modules or dual modules. However, this creates a difficulty in providing access for associated multi-channel devices to all functions which may be performed by the mixer system. For example, a difficulty arises in providing an associated VTR access to the voltage controlled attenuator (VCA) and preview lines in a mixer while retaining the flexibility provided by a modular system.

Thus, there is a need to provide a more flexible mixer system in which various configurations of associated multi-channel devices may be selected. More particularly, there is a need to provide a mixer system which better utilizes the versatility provided by a video editor used to control a modular type mixer. There is a need to ensure that various combinations of multi-channel devices used in a mixer system may access the full range of signal processing functions provided by the mixer system. Finally, there is a need to provide a simple method of selecting a VTR to be associated with each of a plurality of mixer input modules without using a fixed or preprogrammed configuration scheme.

SUMMARY OF THE INVENTION

A general object of this invention is to overcome these and other drawbacks of the prior art, by providing a mixer input module for an audio follow video mixer which includes: input coupling means for supplying at least one audio channel from a multi-channel input device; configuration select means for assigning the multi-channel input device to the mixer input module which include logic circuit means for providing control signals to couple signals from the assigned multi-channel device with the mixer; and channel select means for selecting an audio channel supplied by the assigned multi-channel device.

According to one aspect of the invention, the configuration select means includes configuration display means for visually indicating the assigned multi-channel device coupled to the mixer input module comprising a dual seven segment LED display.

According to yet another aspect of the invention the channel select means includes channel display means for visually indicating a selected audio channel comprising four LEDs, each corresponding to one of four selectable audio channels.

According to yet another aspect of the invention, the mixer input module also includes preview bus select means for selecting a preview bus contained in the audio follow mixer to which the selected audio channel is assigned comprising four LED indicators, each corresponding to a preview bus in the mixer, for visually indicating the preview bus to which a selected audio channel is assigned.

DETAILED DESCRIPTION OF THE PREFERRED EMBODIMENT

Figure 1:
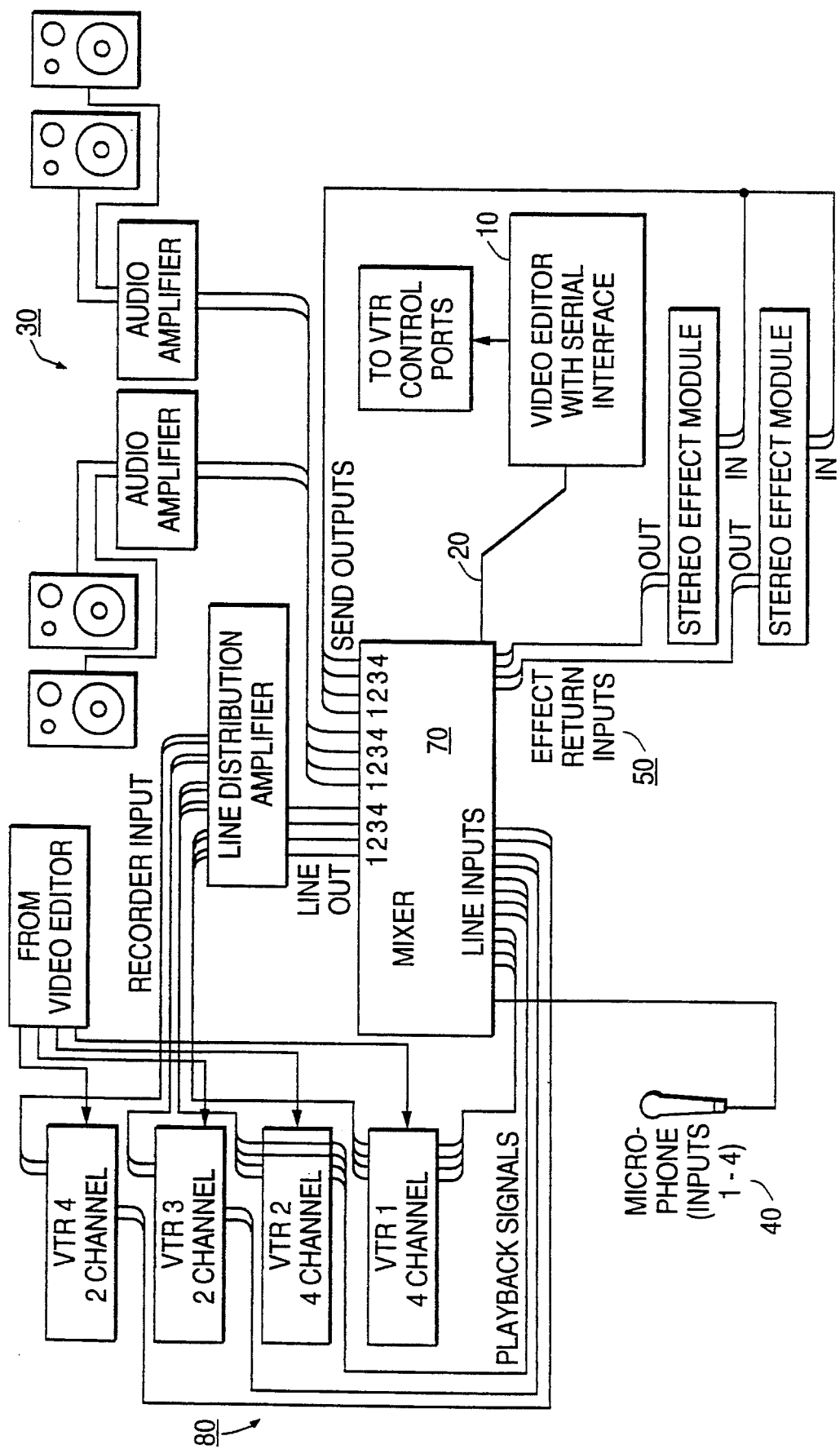
FIG. 1 is a representation of a mixer system according to the present invention.

FIG. 1 is a representation of a mixer system according to the present invention as used in a typical application. The system of FIG. 1 includes an editor 10 connected through a serial editor interface 20 to an audio follow video mixer 70. A plurality of multi-channel devices 80 are connected to the mixer 70 through several line input ports on the mixer. For convenience only, the following description will refer to VTRs, but it is to be understood that the invention is not so limited. Other devices, including other multi-channel devices, may be used with this invention.

As shown in FIG. 1, the editor 10 controls the operation of the audio follow video mixer 70 according to the signals from the video editor 10 supplied to a serial interface 20. The video editor 10 may also control the VTRs 80 through VTR control ports located on the VTRs. Other peripheral devices, such as monitor devices 30, microphone inputs 40, and effects devices 50 may be supplied to aid in mixing. With such a system, an operator of the video editor 10 may process several channels of input supplied to the mixer from different combinations of VTRs 80.

Figure 2:
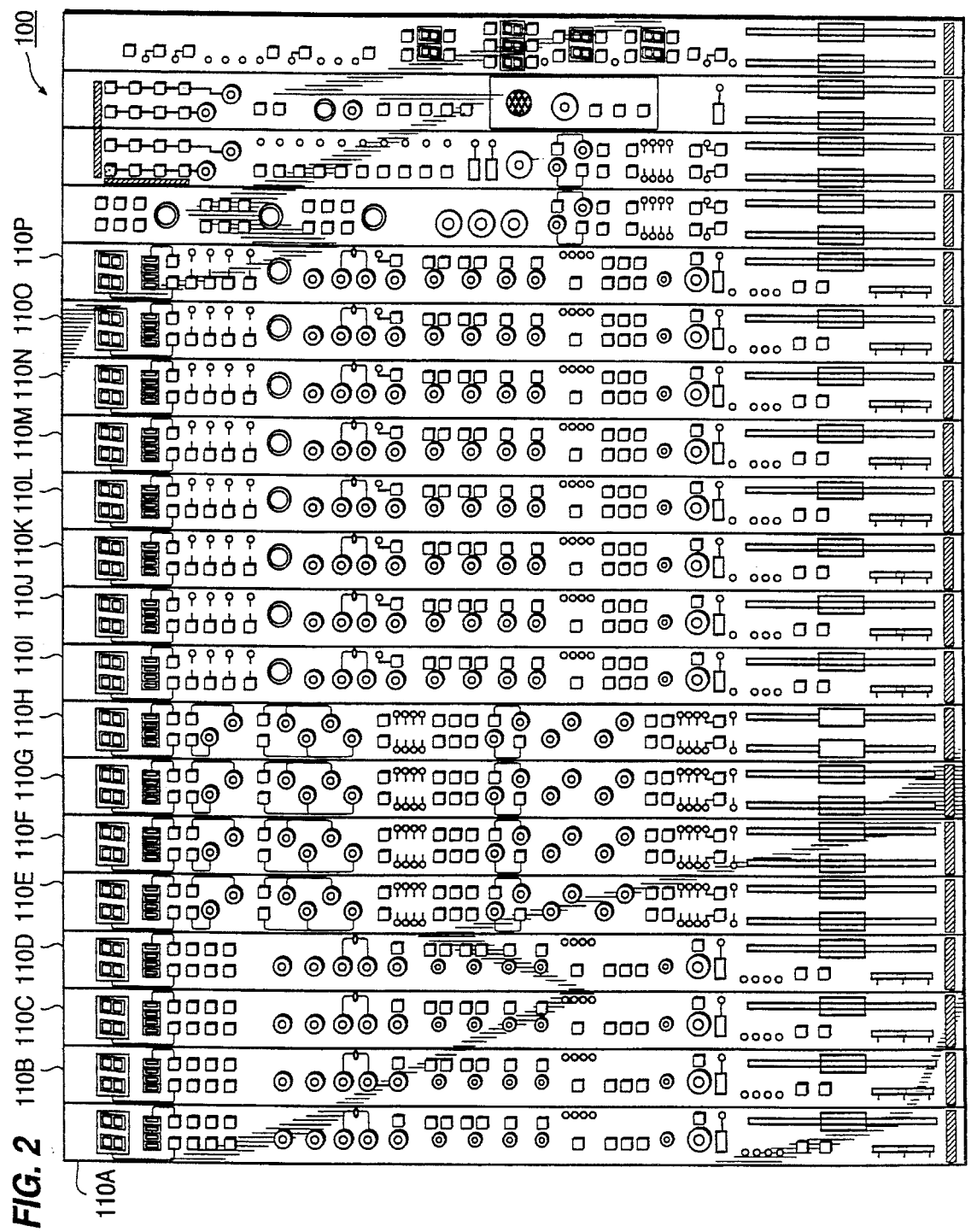
FIG. 2 is front view of a mixer console incorporating the present invention.

FIG. 2 shows a front view of a mixer console 100 according to an embodiment of the invention. In the mixer 100 shown, sixteen input modules 110A, 110B, 110C, 110D, 110E, 110F, 110G, 110H, 110I, 110J, 110K, 110L, 110M, 110N, 110O and 110P are present in the mixer console 100. As illustrated, these input modules may be of several different types, for example, dual, stereo or monaural. Regardless of which type of module that is used, VTR selection may be performed similarly according to the present invention, as described below.

In order to utilize the mixer console 100 to process the various input channels from several VTRs, it is necessary to configure each input module so that it is associated with a particular VTR. For example, a first VTR, such as VTR 1 of FIG. 1, supplies a four channel input which may be supplied to any combination of monaural-, stereo- or dual-type modules in the audio follow video mixer. Once a particular input configuration has been selected, it is necessary to configure the input module receiving an input channel in accordance with the VTR supplying the input channel.

Figure 3:
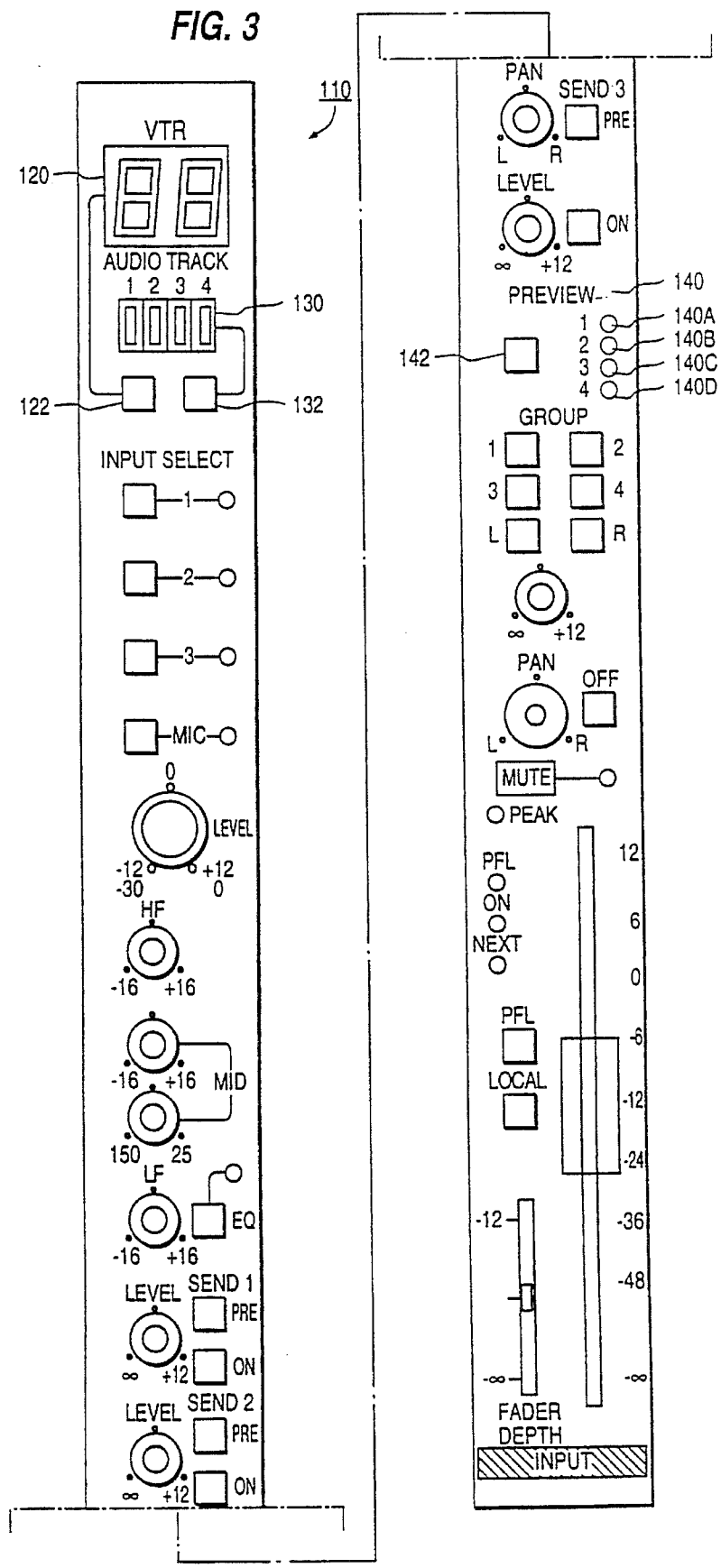
FIG. 3 is a front view of a mixer input module according to one embodiment of the present invention.

FIG. 3 shows a front-view of an input module 110 incorporating an embodiment of the invention. In the example shown, a monaural-type module is illustrated. On the module console is a dual seven segment LED display 120 which displays the number of the VTR which has been selected. The VTR number is selected by pressing a machine select button 122 located below a four bar LED display 130. On initial power up, the VTR configuration display 120 will indicate the last assigned machine number. When the machine select button 122 is pressed, the display will increment to the next number. For example, the module 110 may be constructed to allow the numbers to increment from "RC" (record machine), then through numbers one through sixteen. However, the mixer input modules may be designed to utilize any number of VTRs. For example, instead of using sixteen VTR configuration numbers, thirty-two may be chosen.

Also shown in FIG. 3 is a four segment bar LED 130. This display serves as a VTR audio assignment indicator for the mixer input module 110. This display shows which audio channel, from one to four, of the assigned VTR is assigned to the module. The audio channel of the VTR can be assigned to the mixer input module 110 by pressing the channel select button 132 located below the display 130. On initial power up, the display will indicate the last assigned channel. When the channel select button is pressed, the channel select indicator will increment to the next segment bar LED. The display will cycle through each of the bar segments which correspond to audio channels one to four.

Assigning the VTR audio track to the module in this way will also automatically assign the selected channel to the preview bus of the mixer. For example, if channel one is chosen, then the audio of the input module will be routed to a first preview bus. If channel two is chosen, then audio channel two will be routed to a second preview bus. A similar routing takes place for channels three and four. The preview bus to which a selected audio channel is assigned is displayed by an indicator display 140. In this example, this display includes four individual LEDs 140A, 140B, 140C and 140D, that indicate to which preview bus the selected audio channel is assigned. Each of the four LED indicators 140A, 140B, 140C, and 140D corresponds to a particular preview bus.

The preview bus to which a selected audio channel is assigned may be changed by pressing the preview bus select button 142. Operation of the preview bus select button 142 will not effect the audio channel assignment to the mixer input module 110; rather, only the preview by assignment of a selected audio channel will be changed. Any change of preview bus assignment will be indicated by the preview bus indicator display 140.

Figure 4:
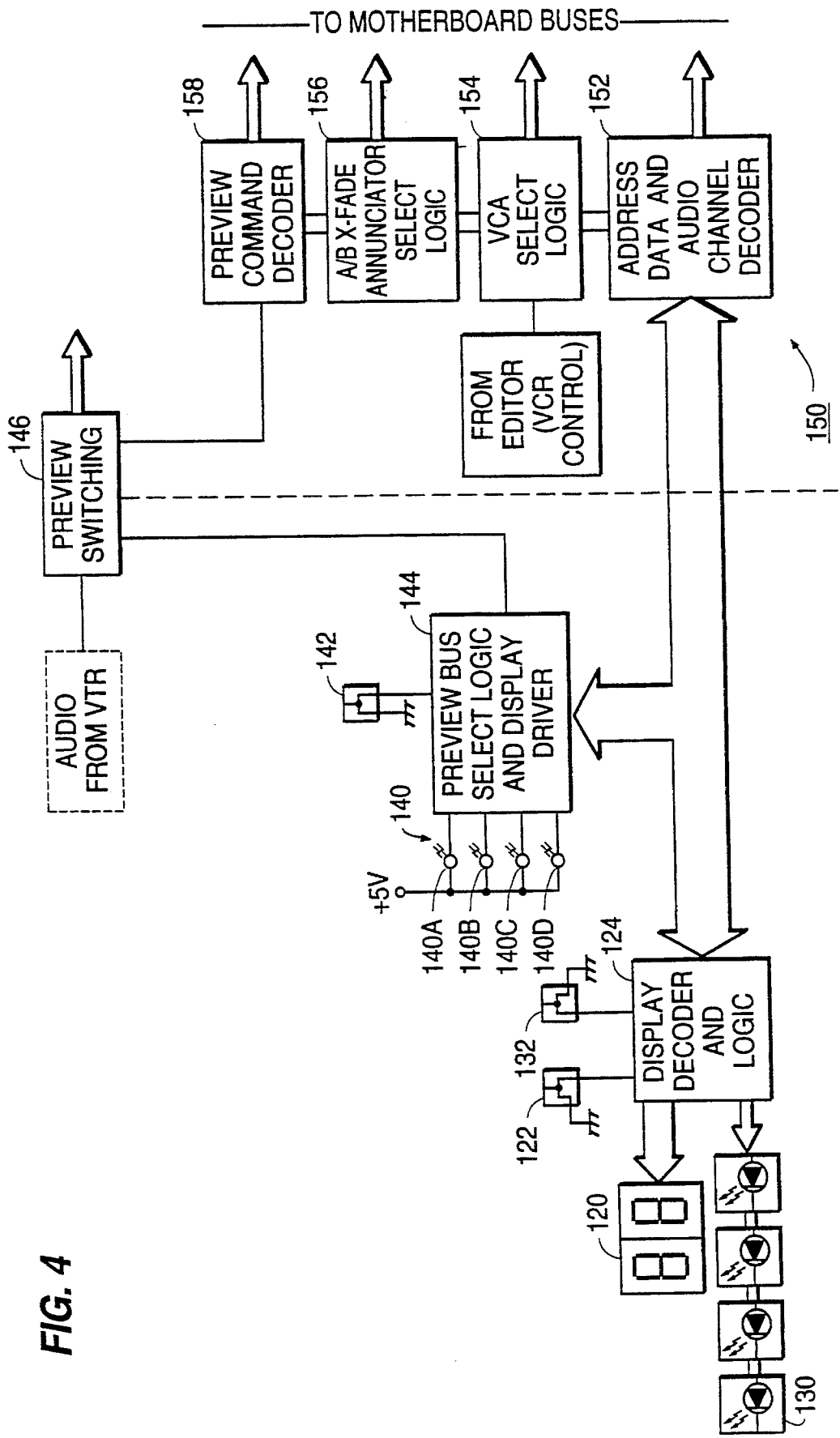
FIG. 4 is a schematic diagram of an embodiment of the present invention.

A more detailed illustration of the circuit which may be used to implement this embodiment is shown in FIG. 4. As in FIG. 3, a machine select button is shown at reference numeral 122, which is used to select the VTR assigned to the mixer input module. When the machine select button is 122 depressed, the display decoder and logic circuit 124 detects this operation and sends out control signals to the dual seven segment LED display 120, which displays the number of the selected VTR as discussed above. Control signals are also sent from this circuit to buses located on the mother board of the audio follow video mixer via several control circuits 150 (i.e., the illustrated circuits 152, 154, 156 and 158). In this way, signals supplied by a VTR connected to the line input of the input module are available for processing by the audio follow video mixer. The configuration display provides the operator with visual confirmation that the correct VTR has been selected.

Similarly, the operator may select the audio channel for the input module by depressing the channel select button 132. This operation causes the display decoder and logic circuit to send signals that illuminate the appropriate bar segment of LED 130. As with the VTR configuration selection, signals indicating the selected audio channel are provided to buses on the mixer mother board via control circuits 150.

The display decoder and logic circuit 124 is also coupled to a preview bus select logic and display driver circuit 144. This circuit drives the appropriate LED indicator 140A, 140B, 140C or 140D, to provide a visual indication of which preview bus is available to the selected audio channel. A preview bus assignment may be changed by depressing the preview bus select switch 142. This operation toggles the preview bus LED indicators and initiates control signals to be sent via the preview bus select logic and display driver circuit 144 to make available the desired preview bus. These control signals are input to a preview switching circuit 146, which routes the audio channel signals from the input VTR accordingly.

The control circuits located on the mixer input module couple the display decoder and logic circuit 124 and the preview bus select and display driver circuit 144 with the various buses located on the motherboard of the mixer. As shown, these control circuits include an address data and audio channel decoder circuit 152, a VCA select logic circuit 154, an A/B cross fade annunciator select logic circuit 156 and a preview command decoder circuit 158. These circuits 150 control the processing of the selected audio channel associated with the VTR coupled to the module.

As this embodiment makes apparent, through use of several of such mixer input modules, it is possible to configure a mixer system in a variety of different ways. According to the invention, it is possible to couple an audio follow mixer with several different combinations of devices having single or plural channel inputs. Furthermore, greater versatility is achieved in that the different channels of an associated multi-channel device can be coupled to the mixer through non-consecutive line input ports in a convenient manner. That is, since each input module can be assigned to any of a number of different VTRs or other devices, it is no longer necessary to use hardwired jumpers or a fixed configuration scheme to provide each channel of an input device to any input of a mixer.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A mixer input module for an audio follow video mixer comprising:

input coupling means for supplying at least one audio channel from a multi-channel input device;

configuration select means for assigning the multi-channel input device to the mixer input module, said configuration select means including logic circuit means for providing control signals to couple signals from the assigned multi-channel device with the mixer; and channel select means for selectively providing an audio channel supplied by the assigned multi-channel device to at least one of N audio signal paths in said mixer;

wherein said configuration select means includes configuration display means for visually indicating the assigned multi-channel device coupled to the mixer input module.

2. The mixer input module of claim 1 wherein the multi-channel device is a VTR.

3. The mixer input module of claim 1 wherein said configuration display means includes a dual seven segment LED display.

4. The mixer input module of claim 1 wherein said channel select means includes channel display means for visually indicating a selected audio channel.

5. The mixer input module of claim 4 wherein said channel display means includes four LEDs, each corresponding to one of four selectable audio channels.

6. The mixer input module of claim 1 further comprising preview bus select means for selecting a preview bus contained in the audio follow mixer to which the selected audio channel is assigned.

7. The mixer input module of claim 6 wherein said preview bus select means includes preview indicator means for visually indicating the preview bus to which a selected audio channel is assigned.

8. The mixer input module of claim 7 wherein said preview indicator means includes four LED indicators each corresponding to a preview bus in the mixer.

9. A reconfigurable audio follow video mixer system, comprising:

a plurality of audio input devices each providing one or more input audio channels;

a mixer console operating coupled to said plurality of audio input devices, said mixer console having N internal audio signal paths coupled to internal circuitry for processing input audio channels assigned thereto; and an editor device coupled to said mixer, said editor device providing control signals to said mixer console which control operations of said internal circuitry on said input audio channels assigned to said N internal audio signal paths;

wherein said mixer consoler includes M input modules each of which receives one or more of said input audio channels from one of said plurality of input devices, said M input modules each having a display portion with a configuration select member incorporated thereon, said configuration select member being operable to produce a configuration signal indicative of the particular audio input device which is coupled to the corresponding input module;

said configuration signal from each input module being provided to said editor device, whereby said editor device can control processing of said input audio channels assigned to said N internal audio signal paths.

10. The reconfigurable audio follow video mixer system according to claim 9 wherein said audio input devices include one or more multi-channel devices.

11. The reconfigurable audio follow mixer according to claim 9 wherein said mixer console includes four internal audio signal paths.

12. The reconfiguration audio follow mixer according to claim 9, wherein said mixer console further includes a plurality of internal preview buses and each input module includes a preview bus selection member on said display portion, said preview bus selection member being operable to produce a preview selection signal to determine which one of said plurality of internal preview buses receives an assigned input audio channel provided from the corresponding audio input device.

13. The reconfigurable audio follow video mixer according to claim 12, wherein each preview selection member is operatively coupled to a preview indicator means for visually indicating which of said preview buses receives said assigned input audio channel.

14. The reconfigurable audio follow video mixer according to claim 9, wherein each configuration select member is operatively coupled to a configuration display means for visually indicating a number corresponding to one of said plurality of audio input devices.

15. The reconfigurable audio follow video mixer according to claim 9, wherein at least one of said plurality of audio input devices is a VTR.

* * * * *